United States Patent
Colgrove

(10) Patent No.: US 7,584,340 B1
(45) Date of Patent: Sep. 1, 2009

(54) SYSTEM AND METHOD FOR PRE-PROVISIONING STORAGE IN A NETWORKED ENVIRONMENT

(75) Inventor: John A. Colgrove, Los Altos, CA (US)

(73) Assignee: Symantec Operating Corporation, Mountain View, CA (US)

(*) Notice: Subject to any disclaimer, the term of this patent is extended or adjusted under 35 U.S.C. 154(b) by 445 days.

(21) Appl. No.: 11/151,333

(22) Filed: Jun. 13, 2005

(51) Int. Cl.
*G06F 13/14* (2006.01)

(52) U.S. Cl. .............. 711/163; 711/137; 711/154; 711/159; 711/169; 713/153; 360/48

(58) Field of Classification Search ............ 711/163, 711/137, 154, 159, 169; 713/153; 360/48
See application file for complete search history.

(56) References Cited

U.S. PATENT DOCUMENTS

| | | | | |
|---|---|---|---|---|
| 6,912,621 | B2* | 6/2005 | Harris | 711/112 |
| 7,080,229 | B2* | 7/2006 | Manbert et al. | 711/170 |
| 7,127,633 | B1 | 10/2006 | Olson et al. | |
| 7,130,960 | B1 | 10/2006 | Kano et al. | |
| 2004/0243699 | A1* | 12/2004 | Koclanes et al. | 709/224 |
| 2005/0283783 | A1* | 12/2005 | DeSota | 718/100 |
| 2006/0143503 | A1* | 6/2006 | Shaik et al. | 714/6 |

OTHER PUBLICATIONS

ByteandSwitch, "BPAR Debuts Thin Provisioning", http://www.byteandswitch.com/document.asp?doc_id=35674&print=true, Jun. 18, 2003, 2 pages.

* cited by examiner

*Primary Examiner*—Tuan V Thai
*Assistant Examiner*—Yong Choe
(74) *Attorney, Agent, or Firm*—Robert C. Kowert; Meyertons, Hood, Kivlin, Kowert & Goetzel, P.C.

(57) ABSTRACT

System and method for pre-provisioning data storage in a network storage environment. Embodiments may pre-provision more storage than needed and make the spare storage available to two or more hosts in the storage network. Spare storage may be pre-provisioned as part of a pool or pools, and any one of the hosts on the storage network may claim spare storage out of the pool(s) to which it has access on an as-needed basis. Embodiments remove the data center's change control process from the critical path in provisioning additional storage, and do not result in the generation of I/O errors on writes to storage if the pool of spare storage available to a host is exhausted. In one embodiment, a coordinating service on the storage network may coordinate access to the pool of spare storage by the hosts on the storage network.

20 Claims, 11 Drawing Sheets

SYSTEM AND METHOD FOR PRE-PROVISIONING STORAGE IN A NETWORKED ENVIRONMENT

BACKGROUND OF THE INVENTION

1. Field of the Invention

This invention is related to the field of computer systems and, more particularly, to network data storage systems.

2. Description of the Related Art

In the past, large organizations relied heavily on parallel SCSI technology to provide the performance required for their enterprise data storage needs. More recently, organizations are recognizing that the restrictions imposed by SCSI architecture may be too costly for SCSI to continue as a viable solution. Such restrictions include the following:

SCSI disk arrays must be located no more than 25 meters from the host server;

The parallel SCSI bus is susceptible to data errors resulting from slight timing discrepancies or improper port termination; and SCSI array servicing frequently requires downtime for every disk in the array.

One solution has been to create technology that enables storage arrays to reside directly on the network, where disk accesses may be made directly rather than through the server's SCSI connection. This network-attached storage (NAS) model eliminates SCSI's restrictive cable distance, signal timing, and termination requirements. However, it adds a significant load to the network, which frequently is already starved for bandwidth. Gigabit Ethernet technology only alleviates this bottleneck for the short term, so a more elegant solution is desirable.

The storage area network (SAN) model places storage on its own dedicated network, removing data storage from both the server-to-disk SCSI bus and the main user network. This dedicated network most commonly uses Fibre Channel technology, a versatile, high-speed transport. The SAN includes one or more hosts that provide a point of interface with LAN users, as well as (in the case of large SANs) one or more fabric switches, SAN hubs and other devices to accommodate a large number of storage devices. The hardware (e.g. fabric switches, hubs, bridges, routers, cables, etc.) that connects workstations and servers to storage devices in a SAN is referred to as a "fabric." The SAN fabric may enable server-to-storage device connectivity through Fibre Channel switching technology to a wide range of servers and storage devices.

SAN management conventionally includes provisioning of and control over host access to individual LUNs (Logical Unit Numbers) within an array or other collection of potentially heterogeneous storage devices. SANs may include storage devices and systems from various storage array providers, for example Hitachi Data Systems, Hewlett Packard and EMC. Ensuring that SAN applications have the required storage resources may include providing secure storage from storage devices (e.g. disk arrays, tape backup devices, etc.) to hosts within the SAN.

A LUN is the SCSI (Small Computer System Interface) identifier of a logical unit within a target, the system component that receives a SCSI I/O command. A logical unit is an entity within a SCSI target that executes I/O commands. SCSI I/O commands are sent to a target and executed by a logical unit within that target. A SCSI physical disk may have a single logical unit, or alternatively may have more than one logical unit. Tape drives and array controllers may incorporate multiple logical units to which I/O commands can be addressed. Each logical unit exported by an array controller corresponds to a virtual disk.

LUN binding refers to the creation of access paths between an addressable unit (which may also be referred to as an AddrUnit, an AU, a unit, a volume, a logical unit, a logical disk, or a logical device) within a disk array and a port on the array. Masking, or LUN masking, may be used to refer to the process of enabling access to a particular Addressable Unit (AU) of storage for a host on the SAN.

FIG. 1 illustrates LUN binding. In the LUN binding process, an AU 108 is bound to a specified array port 106 (e.g. array port 106A or 106B) in a specified storage device 104 (e.g. a storage system/disk array). This results in the creation of a LUN 102. AUs 108A, 108B, 108C, and 108D are storage volumes built out of one or more physical discs within the storage device 104. Array ports 106A and 106B may be connected to a SAN fabric, and function as SCSI targets behind which the AUs 108 bound to those ports 1066 are visible.

"LUN" is the term for the access path itself between an AU and an array port, so LUN binding is actually the process of creating LUNs. However, a LUN is also frequently identified with the AU behind it and treated as though it had the properties of that AU. For the sake of convenience, a LUN may be thought of as being the equivalent of the AU it represents. Note, however, that two different LUNs may represent two different paths to a single volume. A LUN may be bound to one or more array ports. A LUN may be bound to multiple array ports, for example, for failover, switching from one array port to another array port if a problem occurs.

FIG. 2 illustrates LUN masking in a SAN. LUN masking is a security operation that indicates that a particular host 120 (e.g. host 120A or 120B), HBA (Host Bus Adapter) 122 (e.g. HBA 122A or 122B), or HBA port 124 (e.g. HBA port 124A or 124B) is able to communicate with a particular LUN 102. In the LUN masking process, a bound AU 108 (e.g. AU 108A, 108B, 108C or 108D) may be masked to a specified HBA port 124, HBA 122, or host 120 (e.g. all HBAs on the host) through a specified array port 106 in a specified storage device 104. When an array LUN 102 is masked, an entry is added to the Access Control List (ACL) 110 (e.g. ACL 110A, 110B, 110C, 110D, or 110E) for that LUN 102. Each ACL 110 includes the World Wide Name of each HBA port 124 that has permission to use that access path—that is, to access that AU 108 through the particular array port 106 represented by the LUN 102.

LUN masking may be thought of as the removal of a mask between an AU and a host to allow the host to communicate with the LUN. The default behavior of the storage device may be to prohibit all access to LUNs unless a host has explicit permission to view the LUNs. The default behavior may depend on the array model and, in some cases, the software used to create the AU.

The storage management process of allocating units of storage (e.g., AUs on storage devices) to storage consumers (e.g., host systems, or hosts) in a storage network may be referred to as storage provisioning. In a storage network, one or more hosts are each provisioned (granted access to) portions of the storage to meet their current storage requirements. However, storage requirements may, and in many storage networks tend to, increase over time. Rather than purchasing and installing storage on an as-needed basis, a conventional practice in storage management is to pre-provision storage, to purchase and install extra storage in advance to meet anticipated increases in storage requirements of a particular host for at least the near future.

There are conventional mechanisms for provisioning units of extra storage to hosts in a storage network to meet the storage requirements of the hosts as they increase to require more storage. One conventional provisioning mechanism is to purchase and install one or more storage devices (e.g., disk arrays) that provide the required storage as well as extra storage, create a set of LUNs for accessing AUs of the storage to meet the current storage requirements, and allocate the LUNs to the host system. When a host needs additional storage, one or more allocated LUNs may then be used for accessing one or more spare AUs on the storage allocated to the host. Note that, in order for the host to gain access to the newly-allocated storage, the SAN may have to be reconfigured, and the host itself may have to be reconfigured and rebooted. Alternatively, one or more spare LUNs may be preconfigured for accessing the AUs of the extra storage. When a host needs more storage, the storage network and/or the host itself may need to be reconfigured to give the host access to one or more of the spare LUNs.

Storage networks may be fragile, and such a dynamic reconfiguration of the SAN may cause problems elsewhere. Reconfiguring the SAN to give a host access to a LUN may involve configuration of ports on the storage device, switches in between the host and the storage device, and the host itself. The host system may need to be reconfigured and/or rebooted to see the newly-allocated LUN(s). Because of these and other issues, many data centers do not allow this mechanism of dynamic reconfiguration of storage networks. In some data centers, requests for additional storage are required to go through a change control process that may take days or even weeks. Reconfiguration of the storage network to allocate units of spare storage to hosts may be limited by the change control process to periodic maintenance or change windows. This makes it difficult and time-consuming to obtain additional storage when needed, and has led to other provisioning solutions such as thin provisioning.

Another conventional provisioning mechanism is referred to as thin provisioning. Thin provisioning is a provisioning mechanism in which virtual LUNs are over-provisioned to the hosts. In thin provisioning, more storage is provisioned through the virtual LUNs than is actually available. The actual extra storage that is available to be allocated to the virtual LUNs may be referred to as the backing store. For example, in thin provisioning, five hosts may each be assigned virtual LUNs for accessing a terabyte of storage. Thus, five terabytes of storage have been assigned, but the backing store may actually only have one terabyte of actual storage space available. As storage is consumed by the hosts, the array allocates the backing store to the virtual LUNs when needed. Thin provisioning is an "allocate on demand" mechanism. Using thin provisioning, the SAN typically does not have to be reconfigured for the hosts to access additional storage. Thin provisioning thus may help avoid at least some of the configuration problems encountered with other provisioning mechanisms as described above.

However, in a storage network using thin provisioning, if the array ever runs out of real storage (the backing store), the storage network may start failing I/O write operations, and hosts and applications on hosts using that array are typically not prepared to handle these types of I/O errors gracefully. As storage is allocated from the backing store, new storage may have to be installed in the storage network. If the backing store is exhausted, the hosts would think they have storage space available that is not actually available. I/O writes may be blocked or I/O errors may be generated when the hosts attempt to write to the storage. Many systems and applications do not expect to get I/O errors on writes to the storage that they think they actually have, and there are generally no mechanisms for gracefully recovering from these types of errors on writes to storage. A host may have the storage mirrored, and so may try to write to the other mirror, which also does not have storage, so that I/O attempt fails as well.

As an example, a typical file system may attempt to write some data, and get an I/O error on the write if the backing store has been exhausted. For example, the data may be a critical piece of file system metadata. After receiving the I/O error on the write, the file system may not know what is actually on the disk; the file system data may all be corrupted.

As another example, if a database writes into its log and attempts to write back into its table spaces, and then receives I/O errors because backing store has been exhausted, then the database may crash and corrupt itself. Databases are typically not prepared to deal with I/O errors on writes to storage. The database application may record the I/O errors, eventually filling up its error log, and then just halt. This is a difficult type of failure from which to recover.

SUMMARY

Embodiments of a system and method for pre-provisioning data storage in a network storage environment are described. In embodiments of the pre-provisioning mechanism, one or more pools of spare storage are created, and the storage network may be configured so that access to the spare storage is shared among multiple systems (e.g., hosts). When a host needs additional storage, one or more units (e.g., Logical Unit Numbers (LUNs)) of spare storage to which the host has access may be selected from one of the spare pools. The selected storage may then removed from the pool for exclusive access by the host so that other hosts that are configured on the storage network to access that storage cannot use it. In one embodiment, a change control request may be generated to reconfigure the storage network to remove access to units of storage to which a host has obtained exclusive access from any other hosts with access to the selected storage. Since the selected storage has been removed from the pool, other hosts that have access to the storage may not obtain exclusive access to the selected storage while the change control request is pending.

Embodiments of the pre-provisioning mechanism may pre-provision more storage than needed and make the spare storage available to two or more hosts in the storage network. Spare storage may be pre-provisioned as part of a pool or pools, and any one of the hosts on the storage network may claim spare storage out of the pool(s) to which it has access on an as-needed basis. Note that a host does not have to claim an entire storage device or disk from the pool, but may claim one or more portions, or AUs, of a storage device or disk. Using embodiments, spare storage may be made more widely available to hosts on the storage network than in conventional storage networks.

In one embodiment, one or more pools of spare LUNs may be pre-provisioned to host systems or servers on a storage network. In pre-provisioning, each LUN may be masked to two or more of the hosts, giving each of the hosts access to the LUN. When a unit of additional storage (represented by a LUN) is needed by a host, the host may obtain a spare LUN to which the host has access from one of the pools of spare LUNs, the spare LUN may be removed from the pool, and the host may begin using the storage represented by the LUN. A change control request may then be generated to reconfigure the storage network during a change window to disallow access to that LUN from the other hosts that have access to the LUN.

Embodiments of the pre-provisioning mechanism remove the data center's change control process from the critical path in provisioning additional storage. There is no need to wait for a "change window" to reconfigure the storage network to grant access to additional storage. Pre-provisioned LUNs may be removed from the pools at any time, as needed, for use by the hosts, while reconfiguration of the storage network to remove access to the removed LUNs from other hosts may be scheduled at the data center's convenience. Unlike thin provisioning, embodiments of the pre-provisioning mechanism do not result in the generation of I/O errors on writes to storage if the pool of spare storage available to a host is exhausted. If the pool of spare storage available to a host are exhausted, and an application on the host requires more storage, the error generated would be an allocation error, and not a write error.

In one embodiment, a coordinating service on the storage network may coordinate access to the pool of spare storage by the hosts on the storage network. Each host in the storage network that may make use of the pool of spare storage may be configured to communicate with the coordinating service to obtain spare storage from the pool(s). In one embodiment, there may be a central coordinating service or management server for each pool of spare LUNs that hosts with access to that pool may communicate with to gain exclusive access to a LUN in the pool. Alternatively, there may be a single coordinating service that manages access by hosts to all pools of spare LUNs in a storage network.

BRIEF DESCRIPTION OF THE DRAWINGS

The following detailed description makes reference to the accompanying drawings, which are now briefly described.

Figure 1:
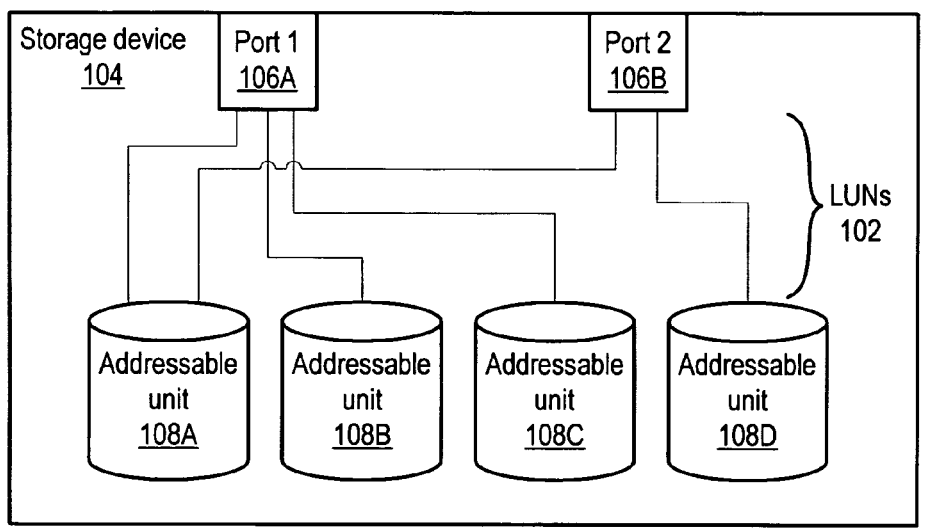
FIG. 1 illustrates LUN binding.
Figure 2:
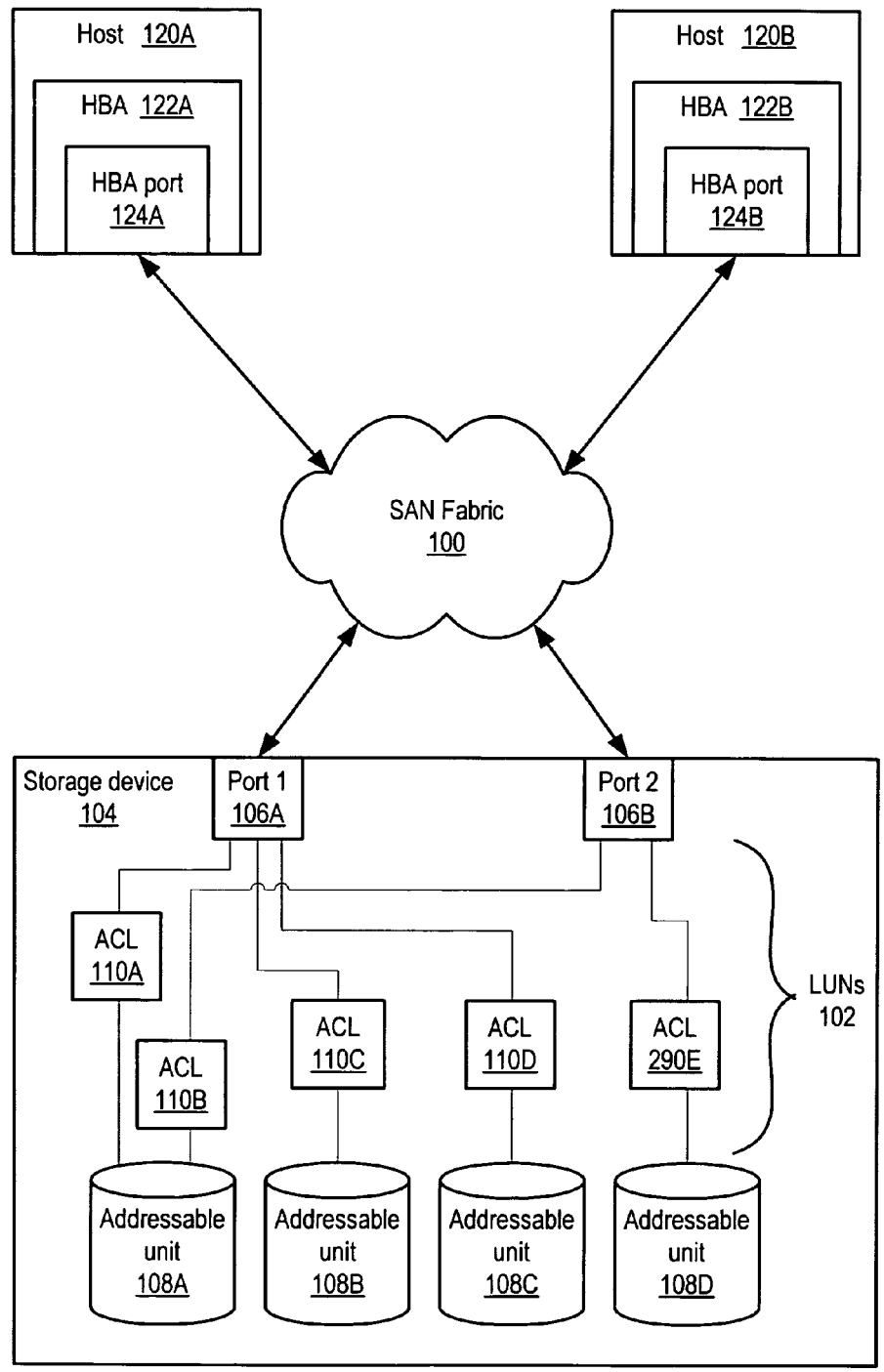
FIG. 2 illustrates LUN masking in a SAN (Storage Area Network).

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Embodiments of a system and method for pre-provisioning data storage in a network storage environment are described. In embodiments of the pre-provisioning mechanism, one or more pools of spare storage may be created, and the storage network may be configured so that access to the spare storage may be shared among multiple systems (e.g., hosts). When a host needs additional storage, one or more units (e.g., Logical Unit Numbers (LUNs)) of unused storage to which the host has access may be selected from one of the spare pools. The selected storage may then be removed from the pool for exclusive access by the host. In one embodiment, a change control request may be submitted to reconfigure the storage network to remove access to the selected storage from any other hosts with access to the selected storage. Since the selected storage has been removed from the pool, other hosts that have access to the storage may not select or use the selected storage while the change control request is pending.

Embodiments of the pre-provisioning mechanism may pre-provision more storage than needed and make the spare storage available to two or more hosts in the storage network. Spare storage may be pre-provisioned as part of a pool or pools, and any one of the hosts on the storage network may claim spare storage out of the pool(s) to which it has access on an as-needed basis. Note that a host does not have to claim an entire storage device or disk from the pool, but may claim one or more portions, or AUs, of a storage device or disk. Using embodiments, spare storage may be made more widely available to hosts on the storage network through the pool(s) of spare storage than in conventional storage networks.

In one embodiment, one or more pools of spare LUNs may be pre-provisioned to host systems or servers on a storage network. In pre-provisioning, each LUN may be masked to two or more of the hosts, giving each of the hosts access to the LUN. When a unit of additional storage (represented by a LUN) is needed by a host, the host may obtain a spare LUN to which the host has access from one of the pools of spare LUNs, the spare LUN may be removed from the pool, and the host may then begin using the storage represented by the LUN. A change control request may be generated to reconfigure the storage network during a change window to disallow access to that LUN from the other hosts that have access to the LUN.

While embodiments of the pre-provisioning mechanism are generally described herein as being used by hosts on a storage network to obtain additional storage from one or more pools of pre-provisioned LUNs, note that various applications on hosts or other systems that use the storage network may generate demand for additional storage that may be fulfilled through the pre-provisioning mechanism. Each host may host one or more instances of various applications, services, processes, etc. that may consume storage space in the storage network. In addition, other systems, such as client systems, may also include applications, services, processes, etc. that may consume storage space in the storage network. Any of these consumers of storage space may require additional storage on the storage network, and the need for additional storage may be met from pools of spare LUNs according to embodiments of the pre-provisioning mechanism as described herein.

Embodiments of the pre-provisioning mechanism remove the data center's change control process from the critical path in provisioning additional storage. There is no need to wait for a "change window" to reconfigure the storage network to grant access to additional storage. Pre-provisioned LUNs may be removed from the pools at any time, as needed, for use by the hosts, while reconfiguration of the storage network to remove access to the removed LUNs from other hosts may be scheduled at the data center's convenience.

Unlike thin provisioning, embodiments of the pre-provisioning mechanism do not result in the generation of I/O errors on writes to storage if the pool of spare storage available to a host is exhausted. If the pool of spare storage available to a host are exhausted, and an application on the host requires more storage, the error generated would be an allocation error, and not a write error. In other words, the error would be generated when a request for more storage was made and not when a write to storage was made. Allocation errors typically do not cause severe problems for applications that are difficult to recover from as do I/O write errors. Applications are typically configured to handle failures on storage allocation gracefully.

In one embodiment of the pre-provisioning mechanism, coordinating software, which may be referred to herein as a coordinating service, on a host or hosts or elsewhere on the storage network may coordinate access to the pool of spare storage by the hosts on the storage network. Each host in the storage network that may make use of the pool of spare storage is configured to communicate with the coordinating service. If a host needs to acquire more storage, the host communicates with the coordinating service to obtain spare storage from the pool(s). In one embodiment, there may be a central coordinating service or management server for each pool of spare LUNs that hosts with access to that pool may communicate with to gain exclusive access to a LUN in the pool. Alternatively, there may be a single coordinating service that manages access by hosts to all pools of spare LUNs in a storage network. In one embodiment, a LUN to which a host has been granted exclusive access may be "marked" with an indication that the LUN has been assigned so that no other hosts with access to the LUN are allowed to use the LUN. In one embodiment, a form of device reservation such as SCSI-3 persistent reservation may be used to mark the LUN. In one embodiment, a label may be written on the LUN to mark the LUN. Other embodiments may use other mechanisms to mark the LUN, or combinations thereof. As mentioned above, a change control request for removal of access to the LUN by other hosts may be submitted, and the removal of access to the LUN may then be performed during a "change window" for the storage network in the data center or at some other time. In one embodiment, a change control request may be automatically generated by the coordinating service when a host requests and is granted exclusive access to a LUN in a pool.

The following is an example of an embodiment of the pre-provisioning mechanism managing spare storage for applications in a storage network. A volume manager is used as an example of an application that may consume storage. A volume manager may include functionality to virtualize physical storage accessible by applications running on host systems. As used herein, the term "volume manager" broadly refers to host software that selects and combines storage space (e.g., LUNs) from more than one physical storage device into a logical volume. A volume manager may support various specific storage management functionality, such as various levels of RAID functionality, including data mirroring and striping. Conventionally, a volume manager is configured with a dedicated pool of storage for its exclusive use. This dedicated pool of storage is a subset of all the storage available on the storage network. In addition, the dedicated pool of storage may be a subset of all the storage that the system (e.g., host) on which the volume manager is implemented can "see"; e.g., the storage that the system has been configured to access through the fabric of the storage network. Other applications on the system or on other systems may also be configured with their own dedicated pools of storage on the storage network. Some of the storage on the storage network is typically "spare" storage that is not allocated to any particular application, and at least some of this spare storage may not be configured to be accessed by systems (e.g., hosts) on the storage network. In addition, some of the storage that is accessible by the system on which the volume manager is implemented may be spare storage. As the volume manager consumes storage space, it uses storage from its dedicated pool. If the volume manager needs additional storage, it cannot use storage on the storage network that is not in its dedicated pool. Some of that other storage may be unused "spare" storage that is accessible by the system, but the volume manager does not know what the storage not in its dedicated pool may be being used for, so cannot determine what of that storage is used and what is unused. In addition, as previously mentioned, some spare storage on the storage network may not be configured for access by the system on which the volume manager is implemented.

In one embodiment of the pre-provisioning mechanism, at least some of the spare storage on the storage network may be placed into one or more pools of spare storage, with each pool including units of storage (e.g., LUNs) each pre-provisioned for access by two or more systems (e.g., hosts) on the storage network. Thus, two or more systems on the storage network, and applications on those systems, may be pre-provisioned to access the LUNs in the pool(s) of spare storage. In one embodiment, one or more coordinating services may be implemented on one or more of the hosts on the storage network. For this example, for simplicity, it will be assumed that there is one coordinating service and one pool of spare storage (LUNs) access to which is controlled through the coordinating service. The coordinating service may track which LUNs in the pool of spare storage are available, which systems are configured to access which LUNs, and which LUNs have been assigned to particular systems and are thus not available to other systems.

The volume manager may be configured to communicate with the coordinating service. Note that the volume manager may be initially configured to use a dedicated pool of storage. If the volume manager needs additional storage beyond what is available in its dedicated pool, the volume manager requests one or more additional units of storage (LUNs) from the coordinating service. To meet the request, the coordinating service may determine which of the LUNs in the pool of spare storage are configured for access by the system on which the volume manager is implemented, and which of those LUNs are available to meet the request (i.e., which of those LUNs have not been previously granted to meet other requests, and thus are no longer available). The coordinating service may then inform the volume manager as to which LUNs in the pool that the volume manager may use. The coordinating service may then "mark" the LUNs as having been granted for exclusive access to the volume manager so that the LUNs are not available to other applications and systems that have access to them. In one embodiment, a form of device reservation such as SCSI-3 persistent reservation may be used to mark the LUN. In one embodiment, a label may be written on the LUN to mark the LUN. Other embodiments may use other mechanisms to mark the LUN, or combinations thereof. In one embodiment, a change control request may be generated so that access to the LUNs to which the volume manager has been granted can be removed from other systems by reconfiguring the storage network, for example at the next change window. In one embodiment, the change control request may be automatically generated.

In the above example, an embodiment is described where an application (e.g., a volume manager) interacts directly with the coordinating service to gain exclusive access to one or more units of spare storage in the pool. In another embodiment, instead of having an application directly communicate with the coordinating service to obtain units of spare storage from the pool, when an application (e.g., a volume manager) needs additional storage, an administrator of the system may interact with the coordinating service through a user interface (e.g. a command line or graphical user interface) to inform the coordinating service as to what units of storage (e.g., LUNs) the system is configured to access, and to request one or more of the units of storage (e.g., LUNs) be assigned for exclusive access by the application. The coordinating service may determine which of the LUNs accessible by the system (and in the pool of spare storage) are "free", i.e. have not been given to another system or application for exclusive access, and return this information to the system administrator. The volume manager may then be configured to use this additional storage. The coordinating service records that the LUNs assigned to the volume manager are no longer available to be assigned to other applications or systems. Again, a change control request may be generated so that the storage network can be reconfigured to remove access to the LUNs from other systems, for example at a next change window.

In one embodiment, a combination of the two methods described above may be used. In other words, some applications may be configured to request exclusive access to spare LUNs from a pool by directly communicating with the coordinating service, while other applications may gain exclusive access to spare LUNs from the pool through interaction of a system administrator with the coordinating service. Note that other embodiments may use other mechanisms for gaining exclusive access to spare LUNs in a pool.

In embodiments, the coordinating service may be configured to handle situations where two or more potentially conflicting requests for spare LUNs are received. The coordinating service coordinates access to the pool of spare storage among all the systems that are configured to access the storage, and provides a handshake/lock mechanism to prevent conflicts in accessing spare storage in the pool. If, for example, there are three different requests made at the same time by systems that are configured to access overlapping units of storage, the coordinating service selects and provides three different units of storage from the pool to satisfy the requests, if available. Once the coordinating service provides a unit of storage from the pool to meet a request, it "marks" the unit of storage so that the unit of storage is no longer available to be selected and provided to meet other requests.

Embodiments of the pre-provisioning mechanism essentially create a layer where a pool of spare storage (LUNs) is configured for access by multiple hosts. All hosts in the storage network may be pre-provisioned with access to at least some of the units of storage in the pool(s). If hosts need access to additional storage, the hosts do a "handshake" through the coordinating service so that two hosts do not gain exclusive access to, and start to use, the same units of storage. Unlike some conventional systems, the storage network does not have to be reconfigured for a host to gain access to additional units of storage; the storage available to application(s) on the host may be dynamically increased.

Note that it is still possible to exhaust the storage available to a host in the pool. However, unlike thin provisioning, if storage accessible by a host is exhausted, an error may be generated on a storage allocation request rather than on an I/O write. For example, a database running on a host may need to grow its storage. The database expects that if it needs to create a new table space or grow an existing table space, it might not have the disk space, and databases are generally configured to gracefully handle those situations. However, databases do not typically expect, and are not typically configured to gracefully handle, failures on writes to disk space that they think they have available. Thus, embodiments of the pre-provisioning mechanism move potential failures due to lack of disk space back from the write frame to the allocation frame where applications generally expect that they might encounter a failure, and are generally configured to gracefully handle the allocation failure.

Figure 3:
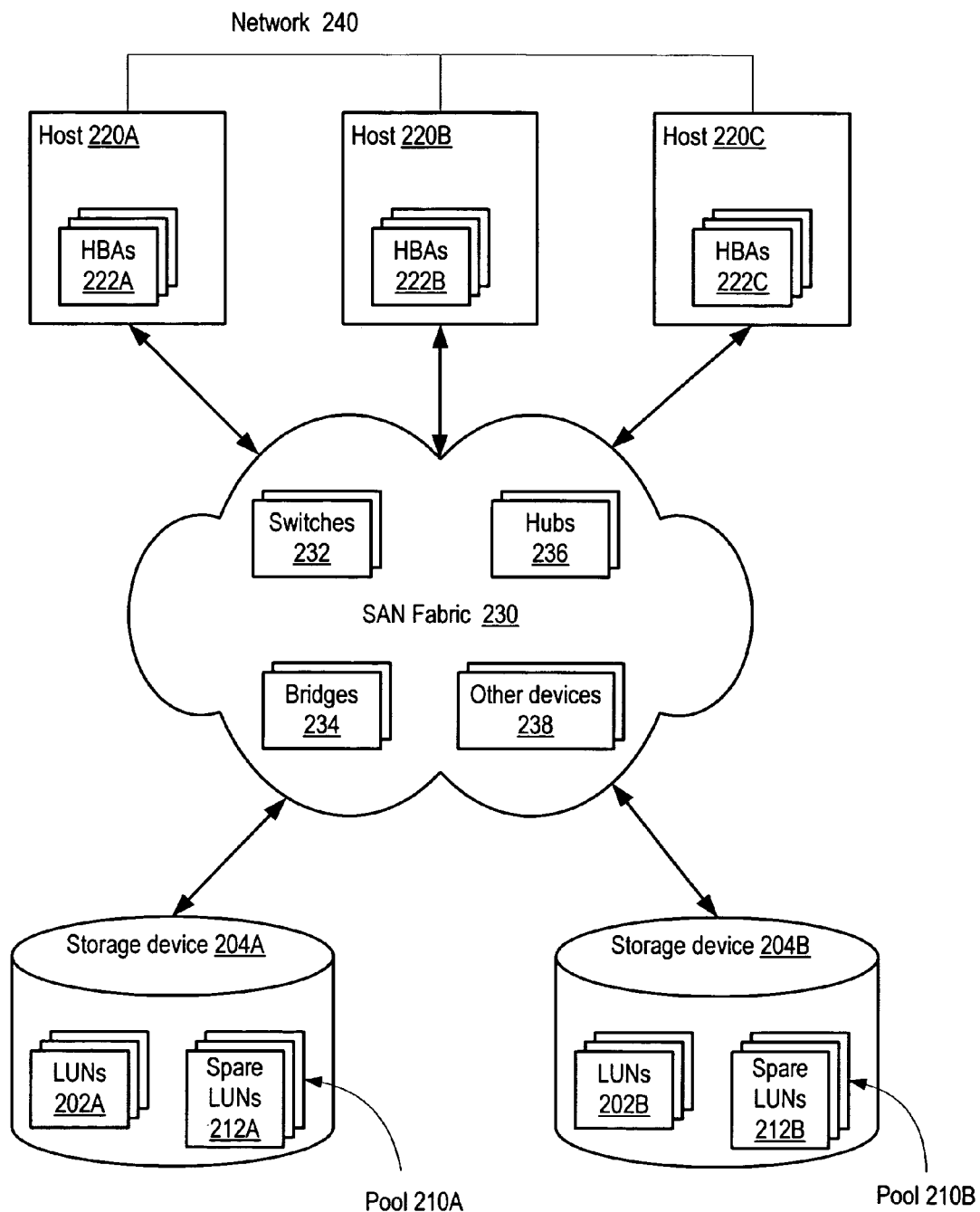
FIG. 3 illustrates an exemplary storage network implementing a pre-provisioning mechanism according to one embodiment.

FIG. 3 illustrates an exemplary storage network implementing a pre-provisioning mechanism according to one embodiment. For one embodiment, SAN may be described as a high-speed, special-purpose network that interconnects storage devices 204 (e.g. storage devices 204A and 204B) with associated data servers (e.g. hosts 220A, 220B, and 220C) on behalf of a larger network of users. A SAN may employ Fibre Channel technology. A SAN may include one or more hosts 220 (e.g. hosts 220A, 220B, and 220C), one or more storage devices 204 (e.g. storage devices 204A and 204B), and one or more SAN fabrics 230. A SAN may also include one or more administration systems (not shown). One or more end-user platforms (not shown) may access the SAN, typically via a LAN or WAN connection, such as network 306, to one or more of the hosts 220. Hosts 220 may also be interconnected via one or more networks 306.

Host systems 220 may be any of various types of devices, including, but not limited to, a personal computer system, desktop computer, laptop or notebook computer, mainframe computer system, workstation, network appliance, network computer, Internet appliance, or other suitable device. Hosts 220 may run any of a variety of operating systems, including, but not limited to: Solaris 2.6, 7, 8, 9, etc.; Linux; AIX; HP-UX 11.0b, 11i, etc.; Microsoft Windows NT 4.0 (Server and Enterprise Server) and Microsoft Windows 2000 (Server, Advanced Server and Datacenter Editions). Each host system 220 may include one or more host bus adapters (HBAs) 222 which each provide host adapter ports for coupling to the SAN. Each host 220 is typically connected to the fabric 230 via one or more HBA 222 ports. SAN fabric 230 may enable server-to-storage device connectivity through Fibre Channel switching technology. SAN fabric 230 hardware may include one or more switches 232, bridges 234, hubs 236, or other devices 238 such as routers, as well as the interconnecting cables (for Fibre Channel SANs, fibre optic cables). Hosts 220 may each include one or more SAN applications (not shown).

Storage devices 204 may include, but are not limited to, RAID (Redundant Array of Independent Disks) systems, disk arrays, JBODs (Just a Bunch Of Disks, used to refer to disks that are not configured according to RAID), tape devices, and optical storage devices. Each storage device 204 (e.g. storage devices 204A and 204B) may include one or more addressable storage units (AUs) and one or more array ports for coupling to the SAN. AUs are storage volumes built out of one or more physical discs within the storage device 204. Array ports may be connected to a SAN fabric, and function as SCSI targets behind which the AUs bound to those ports are visible. In the LUN binding process, an AU is bound to a specified array port in a specified storage device 204 (e.g. a storage system/disk array)). This results in the creation of a LUN 202. "LUN" is the term for the access path itself between an AU and an array port. Note, however, that a LUN 202 is also frequently identified with the AU behind it and treated as though it had the properties of that AU. For the sake of convenience, a LUN 202 may be thought of as being the equivalent of the AU it represents.

When the storage network is first configured, and/or when new storage devices are added or existing storage devices are expanded, LUNs 202 for accessing AUs in each storage device may be created. During initial configuration or when adding or expanding storage devices, some of the LUNs 202 may be specifically assigned to particular hosts 220 for use. In this example, LUNs 202A on storage device 204A and LUNs 202B on storage device 204B may each be assigned to one of hosts 220A, 220B and 220C. Typically, assignment includes configuring the storage network so that a particular array port of a LUN 202 is configured to communicate with a particular HBA port on a particular HBA 222 on one of the hosts 220 through SAN fabric 230. Various components of the SAN fabric 230, such as switches 232, may be involved in the configuration.

In embodiments of the pre-provisioning mechanism, one or more spare LUNS 212 on each storage device may be created and placed into pools 210 of pre-provisioned LUNs. In this example, pool 210A includes spare LUNs 212A on storage device 204A, and pool 210B includes spare LUNs 212B on storage device 204B. Each spare LUN 212 in a pool may be pre-configured, or "masked", for access by two or more of the hosts 220 on the storage network. When additional storage (represented by a spare LUN 212) is needed by a host 220, for example host 220A, the host 220A may select a spare LUN 212 to which the host has been preconfigured to access from one of the pools 210 of spare LUNs, for example from pool 210A, remove the spare LUN 212 from the pool 210A, and then begin using the storage represented by the spare LUN 212. In one embodiment, "removing" a LUN 212 from a pool 210 may include marking the LUN 212 in the pool with an indication so that other hosts 220 will not access, or will not be granted exclusive access to, the LUN 212. Note that other hosts 220 may initially be still configured to access the LUN 212 through an HBA 222 port, but are prevented from actually using the LUN 212 once host 220A claims exclusive access to the LUN 212. A change control request may then be generated to reconfigure the storage network, for example during a change window, to disallow access to the LUN 212 from the other hosts 220 that have access to the LUN 212. Essentially, when reconfigured, the spare LUN 212 to which host 220A has been granted exclusive access becomes one of LUNs 202. All access to the LUN 212 by other hosts is removed, and the LUN 212 is no longer part of a pool 210 of spare LUNs.

In one embodiment, one or more of hosts 220, or alternatively one or more other servers or hosts on the storage network, may include a coordinating service (not shown) through which hosts 220 may request exclusive access to spare LUNs 212 in pools 210. In one embodiment, the coordinating service(s) may maintain information on the spare LUNs 212 in pools 210, may receive requests from hosts 220 for one or more spare LUNs 212 from pools 210, may select one or more spare LUNs 212 from pools 210 pre-provisioned for access by a requesting host 220 to meet a request, may inform the requesting host 220 as to which LUN(s) 212 the host 220 has been granted exclusive access, and may update its pool information to indicate that the host 220 has been granted exclusive access to the LUN(s) 212 so that no other hosts 220 are granted access to the LUN(s) 212. A change control request may be generated so that the storage network may be reconfigured, for example during a change window, to remove access to the LUN(s) 212 by all hosts 220 except the host 220 to which exclusive access has been granted. In one embodiment, the coordinating service may automatically generate the change control request. In one embodiment, communications between the hosts 220 and the coordinating service may be via network 240.

Figure 4A:
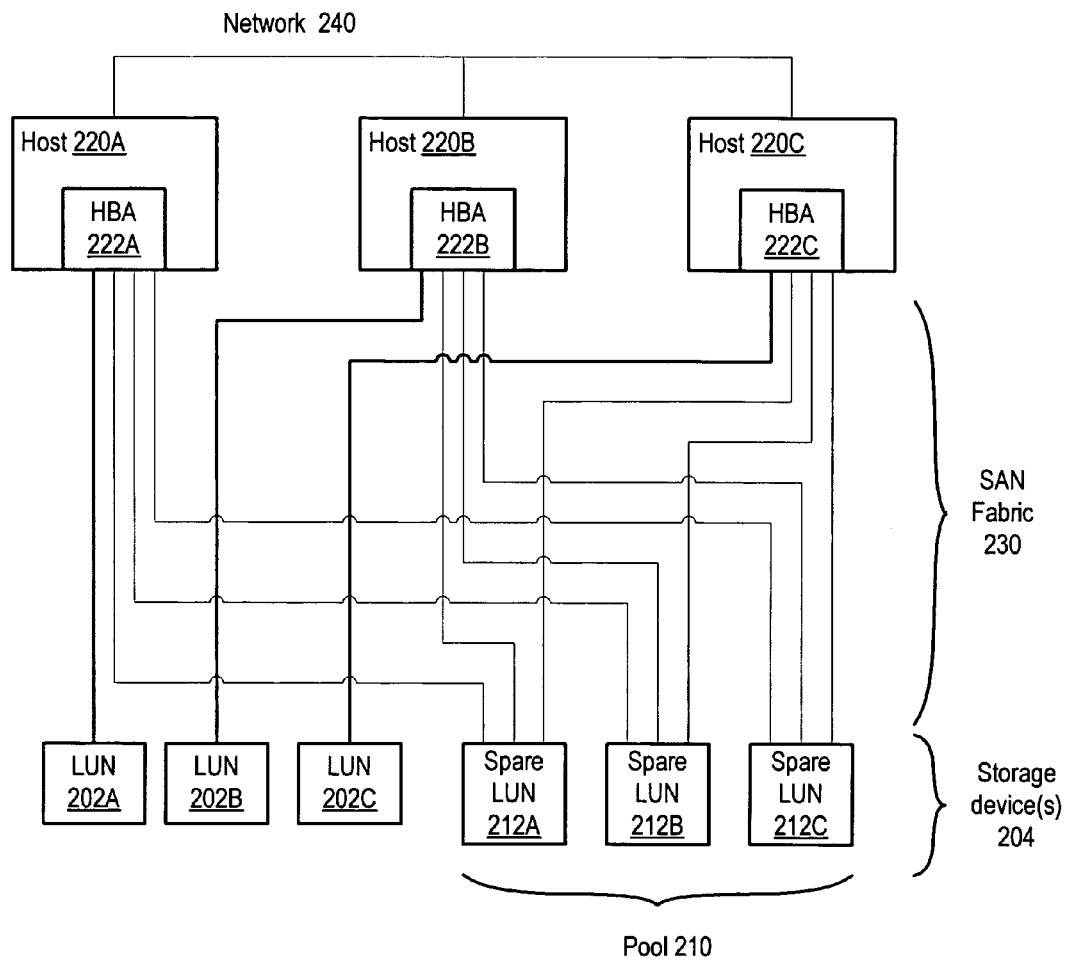
FIGS. 4A through 4C illustrate an exemplary storage network in which a pool of spare LUNs is pre-provisioned to two or more host systems according to one embodiment.
Figure 4B:
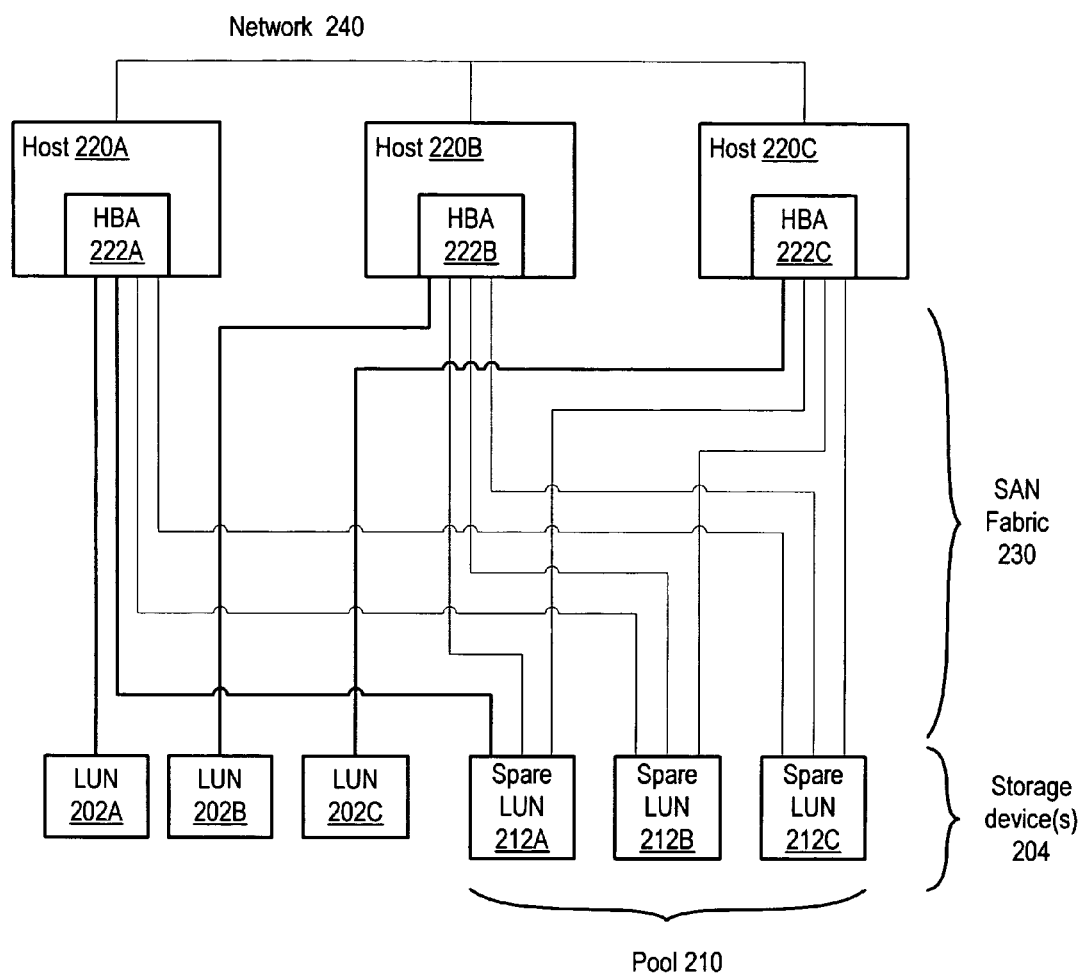
Figure 4C:
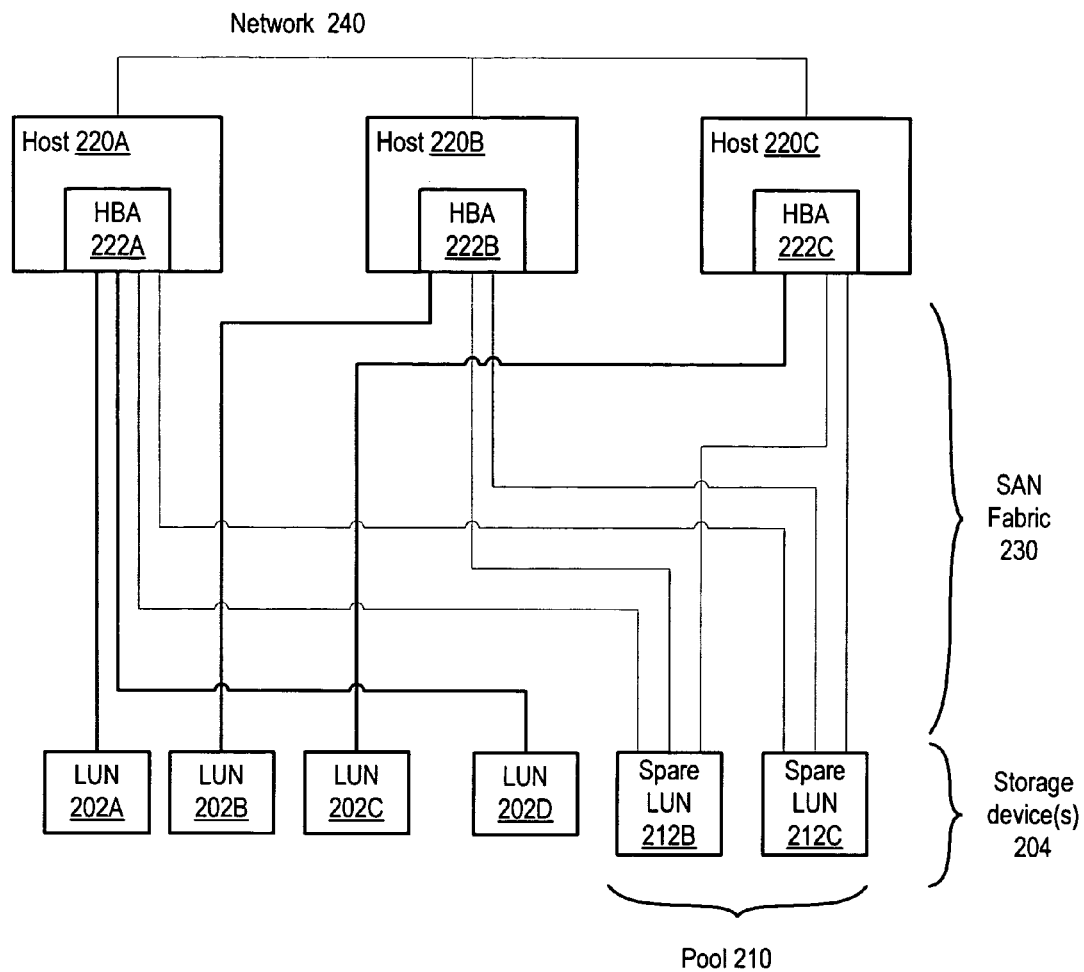

FIGS. 4A through 4C illustrate an exemplary storage network in which a pool of spare LUNs is pre-provisioned to two or more host systems according to one embodiment. In FIG. 4A, three hosts 220 (hosts 220A, 220B and 220C) have each been configured for exclusive access to a LUN 202 on storage device(s) 204 (LUNs 202A, 202B and 202C, respectively) via the HBAs 222 of the hosts 220. The connections from the HBAs 220 through SAN fabric 230 to LUNs 202 are represented by bolded lines. In addition, three spare LUNS 212 on storage device(s) 204 (spare LUNs 212A, 212B and 212C) have been pre-provisioned to hosts 220 in pool 210. Each spare LUN 212 in pool 210 has been configured for access by each host 220 via the HBA 222 of the host 220. The pre-provisioned connections from the HBAs 220 through SAN fabric 230 to spare LUNs 212 are represented by the thinner, non-bolded lines. Spare LUNs 212 represent extra storage space on storage device(s) 204 that has been pre-provisioned for access by each of the hosts 220 on an as-needed basis. Initially, none of the hosts 220 is using the spare storage represented by the spare LUNs 212 in pool 210.

At some point, one of the hosts 220 may require additional storage. In FIG. 4B, host 220A requires additional storage, and selects spare LUN 212A which host 220A has been preconfigured to access from pool 210 to meet its storage requirements, LUN 212A may be removed from the pool 210, and then host 220A may begin using the storage represented by the spare LUN 212A. In one embodiment, "removing" LUN 212A from pool 210 may include marking the LUN 212A in the pool with an indication so that other hosts 220 will not access, or will not be granted exclusive access to, the LUN 212A. Note that, as indicated in FIG. 4B, other hosts 220 may initially be still configured to access the LUN 212A, but are prevented from actually using the LUN 212A once host 220A claims exclusive access to the LUN 212A. A change control request may then be generated to reconfigure the storage network, for example during a change window, to disallow access to the LUN 212A from the other hosts 220 that have access to the LUN 212A. Essentially, when reconfigured, the spare LUN 212A to which host 220A has been granted exclusive access becomes one of LUNs 202. All access to the LUN 212A by other hosts is removed, and the LUN 212A is no longer part of pool 210. FIG. 4C illustrates the exemplary storage network of FIGS. 4A and 4B after reconfiguration to remove access to spare LUN 212A by hosts 220B and 220C. Note that spare LUN 212A has now become LUN 202D, and is no longer indicated as being in pool 210. Also note that access paths through SAN fabric 230 from hosts 220B and 220C to LUN 202D (formerly spare LUN 212A) have been removed.

In embodiments, spare LUNs 212 may be added to pool 210. For example, it may be necessary or desirable to add additional storage, and spare LUNs 212, if pool 210 is exhausted or nearly exhausted. The data center may, for example, set a policy that pool 210 should include at least three spare LUNs 212, or alternatively at least a certain amount of storage represented by the spare LUNs, to meet potential storage requirements for the storage network over a period. To add spare LUNs 212, additional LUNs in storage device(s) 204 may be created and added to the pool if there are AUs that have not been configured for access via a LUN. Alternatively, additional storage devices may be added to the storage network, one or more LUNs may be created for at least some of the AUs in the storage devices, and the LUNs may be configured and added as spare LUNs 212 in the pool 210. Typically, but not necessarily, configuring and adding additional LUNs may be done during a change window or other "down time". In one embodiment, if a host 220 no longer needs a LUN 202 to which it has exclusive access, the storage network may be reconfigured (for example, during a change window) to move the LUN 202 to pool 210 of spare LUNs 212.

Figure 5:
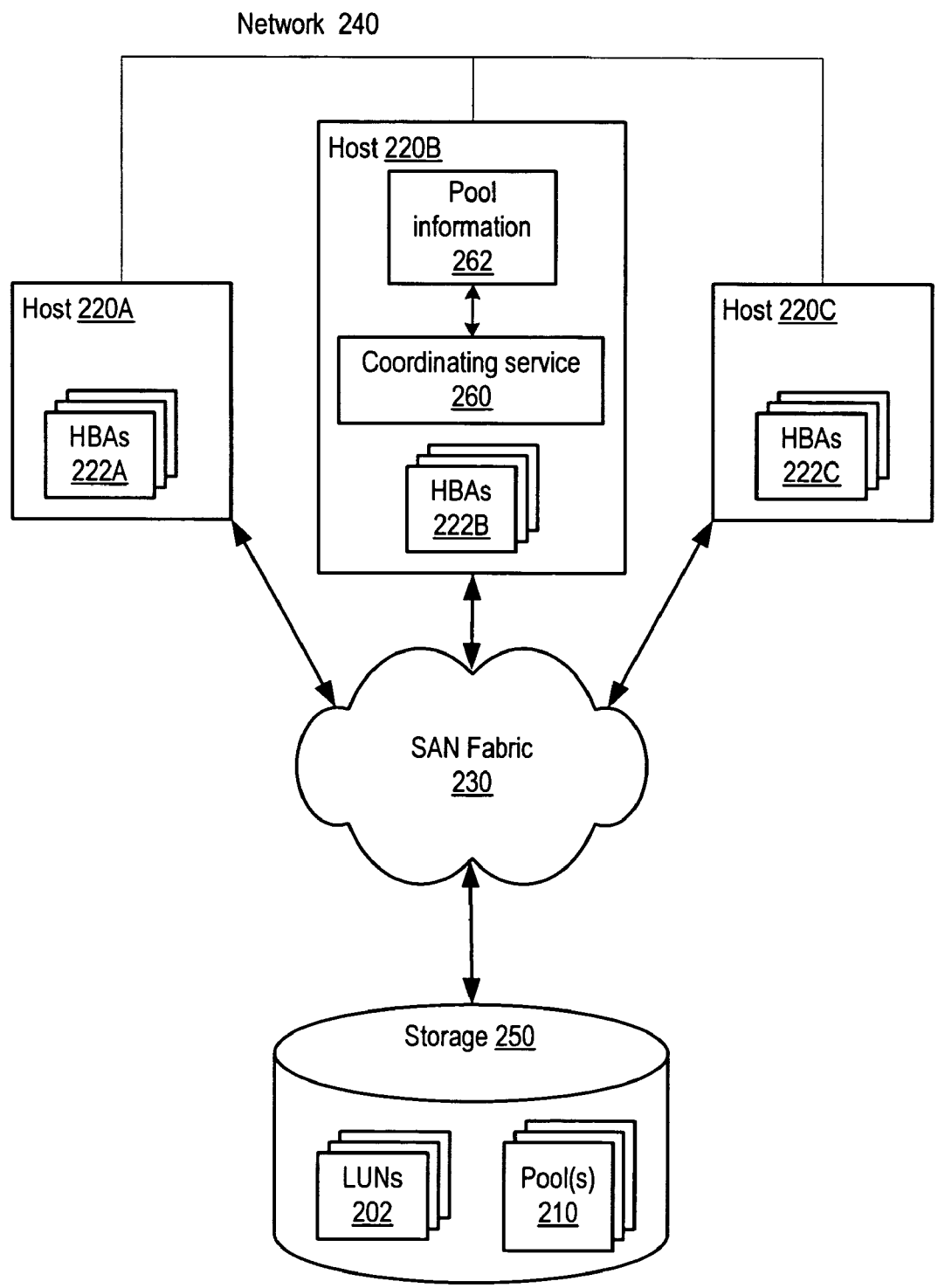
FIG. 5 illustrates an exemplary storage network implementing a pre-provisioning mechanism including a coordinating service according to one embodiment.

In one embodiment, one of hosts 220, or alternatively some other server or host on the storage network, may include a coordinating service through which hosts 220 may request exclusive access to a spare LUN 212 in a pool 210. FIG. 5 illustrates an exemplary storage network implementing a pre-provisioning mechanism including a coordinating service according to one embodiment. In this example, one or more storage devices in the storage network are represented as storage 250 for simplicity. Pools 210 represent one or more pools of spare LUNs in storage 250 that are pre-provisioned to hosts 220. Host 220B implements an instance of coordinating service 260.

In one embodiment, the coordinating service 260 may maintain information 262 on the spare LUNs in pool(s) 210. If a host 220 needs additional storage, the host 220 may communicate with the coordinating service 260 to request a spare LUN from a pool 210 to which the host has access. The coordinating service 260 may select a spare LUN 212 from a pool 210 to meet the request, and may inform the requesting host 220 that the host 220 has been granted exclusive access to the LUN. The coordinating service 260 may update its pool information 262 to indicate that the host 220 has been granted exclusive access to the LUN 212 so that no other hosts 220 are granted access to the LUN. A change control request may be generated so that the storage network may be reconfigured, for example during a change window, to remove access to the LUN by all hosts 220 except the host 220 to which exclusive access has been granted. In one embodiment, the coordinating service 260 may automatically generate the change control request. In one embodiment, communications between the hosts 220 and the coordinating service 260 may be via a network 240.

Note that while in FIG. 5 coordinating service 260 is illustrated as being implemented on host 220B that is one of the hosts 220 that is configured to access LUNs on storage 250, in one embodiment a coordinating service 260 may be implemented on a separate system, such as a SAN management server. In one embodiment, coordinating service 260 may be implemented as part of a SAN management service. In one embodiment, each pool 210 of spare LUNs in a storage network may have a unique instance of a coordinating service 260 that controls access to spare LUNs in the pool 210 by hosts 220. In one embodiment, there may be two or more instances of coordinating service 260 in a storage network, with each instance of coordinating service 260 being responsible for managing access to one or more pools 210 of spare LUNs.

In one embodiment, rather than having a central coordinating service 260 that manages access by the hosts to spare storage in the pool(s), a coordinating mechanism may be implemented as a distributed or clustered application on two or more systems cooperating in a peer-to-peer relationship to coordinate access to the spare storage in the pools. For example, if there are ten hosts sharing a pool of spare storage, the hosts may all run a clustered application to coordinate access to the spare storage in the pool in a peer-to-peer relationship. In implementations with many systems having access to a pool of spare storage, for example 1000 systems that have access to the pool in an IP network that does not impose a connection limit as does Fibre Channel, such a peer-to-peer implementation of a coordinating mechanism may be impractical. For such implementations, there may be a centralized coordinating service on the network, for example implemented on a cluster of two or more highly available hosts, that serve as "gatekeepers" that coordinate access to the spare storage in the pool(s) rather than having all of the systems running a peer-to-peer type application.

Figure 6:
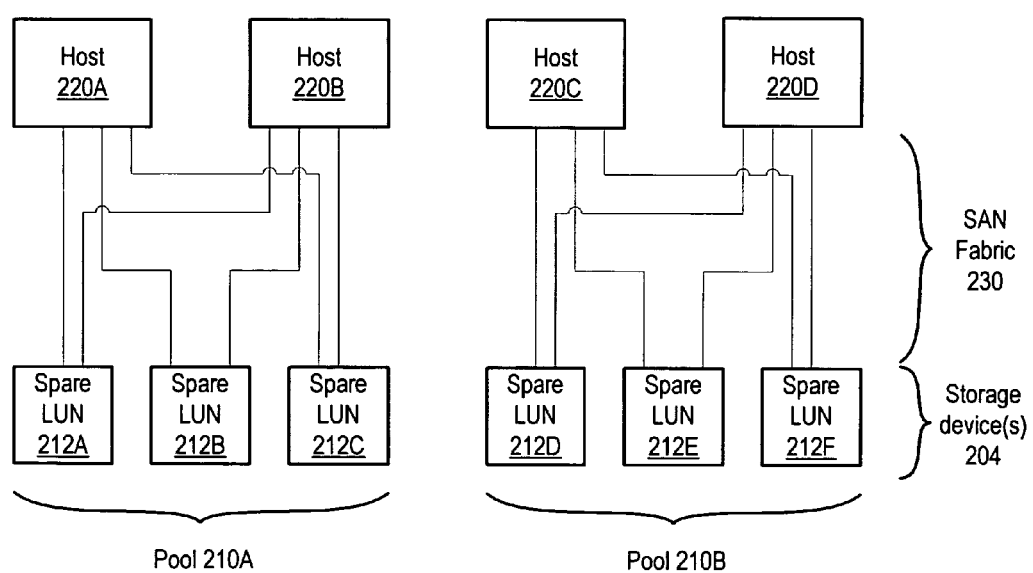
FIG. 6 illustrates an exemplary configuration for pools of spare storage in which spare LUNs are divided into two pools, and hosts are divided among the pools, with each host configured to access LUNs in one of the pools, according to one embodiment.
Figure 7:
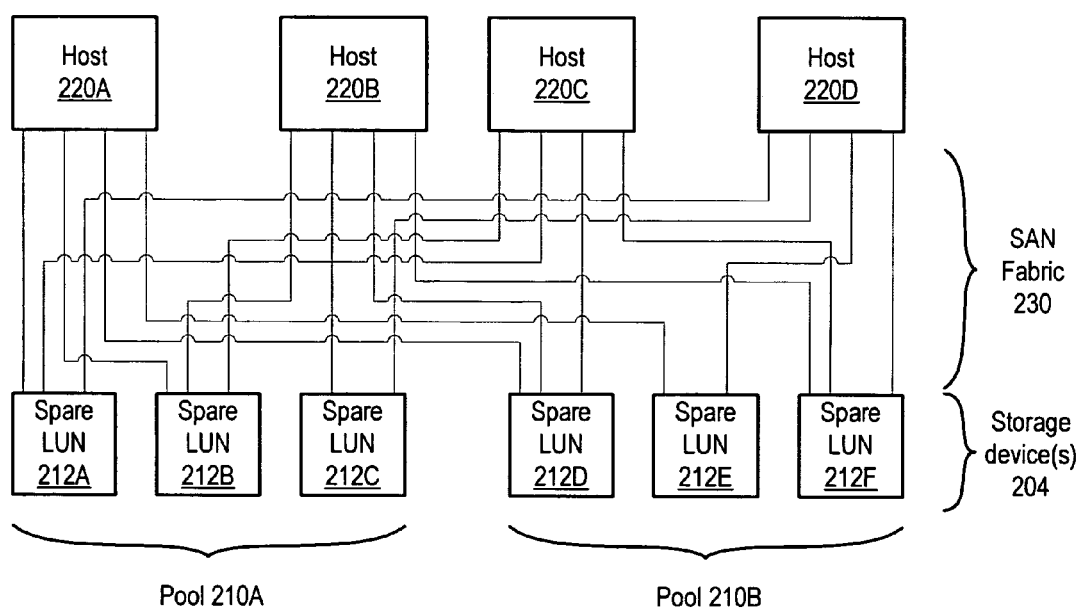
FIG. 7 illustrates an exemplary configuration for pools of spare storage in which spare LUNs are divided into two pools and non-overlapping sets of hosts are configured to access sets of LUNs from the two pools according to one embodiment.

FIG. 6 and FIG. 7 illustrate exemplary configurations for pools of spare storage according to embodiments, and are not intended to be limiting. Note that FIGS. 4A through 4C illustrate spare LUNs in one pool. In embodiments, spare LUNs may be organized into one or more pools. In both FIGS. 6 and 7, spare LUNs are illustrated as organized into two pools for simplicity. Note that the discussion of FIGS. 6 and 7 may be extended to implementations where spare LUNs are organized into more than two pools.

In FIG. 6, the spare LUNs 212 on storage device(s) 204 are shown divided equally into two pools 210 via SAN fabric 230. Hosts 220 are also divided, with some hosts 220 being configured, or pre-provisioned, to access LUNs 212 only in one pool 210, and other hosts 220 being configured, or pre-provisioned, to access LUNs 212 only in the other pool 210. In this example, hosts 220A and 220B are configured to access LUNs 212A, 212B and 212C in pool 210A, and hosts 220C and 220D are configured to access LUNs 212D, 212E and 212F in pool 210B. In this example, each host 220 is configured to access all the LUNs 212 in its associated pool 210. Note that this arrangement is exemplary, and that a host 220 may be configured to access only a subset of the LUNs 212 in its associated pool 210, and/or may be configured to access LUNs 212 in two or more pools.

The organization of the pools 210 and hosts 220 in FIG. 6, where the hosts 220 are split among two or more discrete pools 210, gives each host 220 access to as many LUNs 212 as are in the pool 210 to which the host is associated or assigned. If there are N LUNs in a pool 210, then a host assigned to that pool 210 and that pool only may be configured to access at most N LUNs. In FIG. 6, each host 212 is configured to access three LUNs 212 and only three LUNs.

FIG. 7 illustrates a different organization for pools 210 and hosts 220 that may provide a host 220 access to more LUNs 212 than the organization illustrated in FIG. 6, and that thus may be more robust than splitting hosts 220 among two or more discrete pools 210. In this example, the spare LUNs 212 on storage device(s) 204 are again shown divided equally into two pools 210 via SAN fabric 230. However, instead of splitting hosts 220 among the two pools 210, non-overlapping sets of hosts 220 are configured to access sets of LUNs 212 from the two pools 210. Thus, each host 220 may be configured to access more than the number of LUNs 212 in any single pool 210. This makes it less likely that spare storage in any one pool 210 will be exhausted.

In FIG. 7, each host 220 is configured to access four LUNs 212 from the two pools, with each host 220 configured to access two LUNs 212 from each pool 210 of three LUNs 212. In this example, host 220A is configured to access LUNs 212A and 212B in pool 210A, and LUNs 212D and 212E in pool 210B. Host 220B is configured to access LUNs 212B and 212C in pool 210A, and LUNs 212D and 212F in pool 210B. Host 220C is configured to access LUNs 212A and 212B in pool 210A, and LUNs 212D and 212F in pool 210B. Host 220D is configured to access LUNs 212A and 212C in pool 210A, and LUNs 212E and 212F in pool 210B. Note again that this is exemplary, and that other assignments of hosts 220 to LUNs 212 may be made. For clarity:

| HOST | LUNs (POOL 210A) | | | LUNs (POOL 210B) | |
|------|------|------|------|------|------|
| 220A | 212A | 212B |      | 212D | 212E |      |
| 220B |      | 212B | 212C | 212D |      | 212F |
| 220C | 212A | 212B |      | 212D |      | 212F |
| 220D | 212A |      | 212C |      | 212E | 212F |

Fibre Channel (FC)

Fibre Channel (FC) is a common connection/communications medium used to connect storage to hosts in storage networks. FC has a commonly implemented connection limit of 32 logins to any target. In a storage network that uses FC, there cannot be more than 32 HBA ports, or systems (hosts), configured to access the same LUN. Thus, in FC implementations, or in other implementations using storage protocols with connection limits, depending on the number of hosts, the pre-provisioned spare storage (LUNs) may be divided into one or more pools. For example, in a FC storage network with 40 hosts and N spare LUNs, the N spare LUNs may be divided into one or more pools. With one pool, each of the 40 hosts may be configured to access the N spare LUNs in the pool (depending on available HBA ports on the hosts), but each LUN may be configured for access by at most 32 of the hosts. With two pools, 20 of the hosts may be assigned to one pool, the other 20 assigned to the other pool, and each host may be configured to access all of the LUNs in its assigned pool, as in the example illustrated in FIG. 6. Alternatively, the hosts may be assigned to LUNs in both pools, as in the example illustrated in FIG. 7. Note that the N spare LUNs may be divided into three or more pools, with hosts either assigned to a particular pool or configured to access LUNs in one or more of the pools.

Hosts are configured, or masked, to access particular spare LUNs; a host has access to LUNs which it is configured to access, and thus is "assigned" to one or more pools that include spare LUNs to which it has access. Once the spare LUNs are assigned to hosts and thus divided into one or more pools, any host that has access to a particular LUN in a pool may request and be granted exclusive access to the LUN. Other hosts that have been configured to access the spare LUN may then be blocked from gaining exclusive access to the LUN. As described above, in one embodiment, a coordinating service may act as a coordinator between hosts configured to access a pool of spare LUNs. A change control request may be generated, and during a change window the storage network may be reconfigured so that other hosts no longer have access to that spare LUN.

During a change window, the storage network may also be reconfigured to refresh the pools of spare LUNs by adding new spare LUNs and/or by "balancing" the pools by reconfiguring various hosts to access different spare LUNs in the same or other pools or removing access by certain hosts to certain spare LUNs, effectively moving spare LUNs to other pools and/or moving hosts to other pools. Note that a host does not have to wait for a change window to gain access to and start using needed storage. A host may gain exclusive access to spare storage at any time; at a change window, the storage network may be reconfigured to remove access to LUNs that have been claimed for exclusive access, refresh the pools, balance the pools, or even add or remove pools.

Note that, in the above example where 40 hosts are split with 20 of the hosts configured to access the spare LUNs in one pool and the other 20 hosts configured to access the spare LUNs in another pool, or in general in any implementation of the pre-provisioning mechanism, it is possible to exhaust the spare LUNs in a pool if the hosts consume all of the spare LUNs. If this happens, errors may be generated on storage allocations and not on I/O write operations, as might happen in storage networks that use thin provisioning. As noted, storage allocation errors are less likely to cause serious problems for applications than are errors on I/O write operations.

Various methods may be used to divide the spare LUNs into pools. As mentioned, N spare LUNs may be divided into M pools (e.g., two pools), and the hosts on the storage network may be divided more-or-less equally among the pools, with each host assigned to only one pool. Knowledge of the storage demand of various hosts may be applied to modify this method, for example by assigning hosts that tend to use more storage to larger pools, and hosts that tend to use less storage to smaller pools.

Alternatively, N spare LUNs may be divided into a set of M pools, with the hosts having access to spare LUNs in each of the M pools, and a non-overlapping set of hosts having access to each pool. Using this method, each host may be able to see more spare storage than in the method described above that splits hosts among a set of discrete pools. Each host will be able to access more spare storage because each host has access to more than one pool. Using this method, it may be less likely that one set of hosts will exhaust a particular pool.

Note that the above methods of dividing hosts among pools of spare storage are exemplary, and that a variety of other methods may be used to determine how large to make each pool, how much spare storage to assign to each host, how to divide the hosts among the pools, and how to overlap the pools for optimal robustness.

For an implementation where the storage protocol imposes a connection limit, and thus the spare storage may be distributed among two or more pools, a storage service may be implemented for each pool of spare storage. Alternatively, there may be one central storage service, implemented on one or more systems, that manages access by the hosts to all the pools of spare storage. As another alternative, each host or system may include an implementation of a distributed storage management application that cooperate in a peer-to-peer relationship to coordinate access to the pool(s) of spare storage.

Storage Protocols without Connection Limits

Some storage/network protocols, such as IP, that may be used in storage networks to connect hosts to storage may not have a connection limit as does FC. In storage networks that use a storage protocol without a connection limit, spare storage may be configured into one pool that may be larger than a pool would typically be in an FC implementation, where the connection limit may necessitate breaking the spare storage into two or more smaller pools. On an IP network, for example, there is no connection limit; it is possible to have 1000 or more hosts all "seeing" the same storage. Thus, in an IP network, it is possible to have 1000 or more hosts sharing one pool of spare storage. Note that, even in such a storage network, embodiments allow the spare storage to be broken into two or more pools.

As noted above, in implementations with many systems having access to a pool of spare storage, for example 1000 systems that have access to the pool in an IP network that does not impose a connection limit as does Fibre Channel, there may be a centralized coordinating service on the network, for example implemented on a cluster of two or more highly available hosts, that serve as "gatekeepers" that coordinate access to the spare storage in the pool(s) rather than having all of the systems running a peer-to-peer type application.

Figure 8:
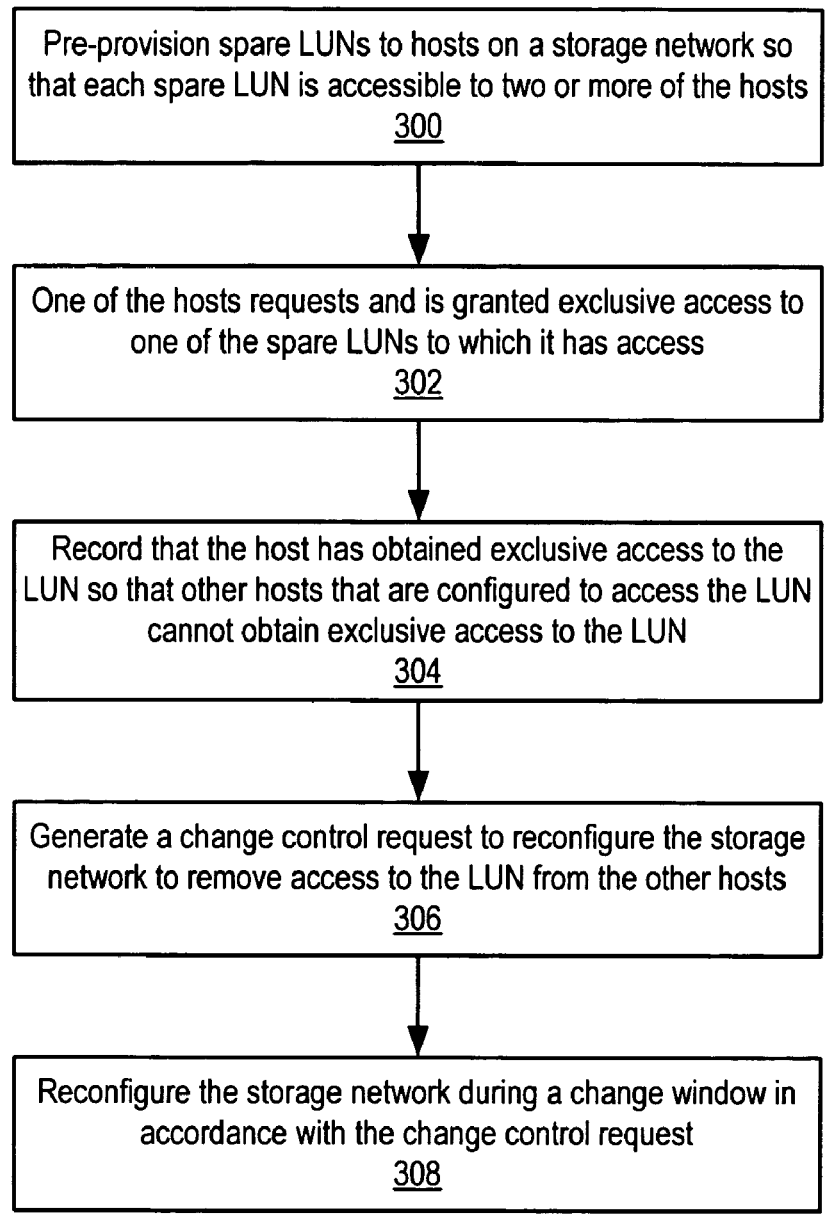
FIG. 8 is a flowchart illustrating a method of pre-provisioning spare storage to hosts in a storage network according to one embodiment.

FIG. 8 is a flowchart illustrating a method of pre-provisioning spare storage to hosts in a storage network according to one embodiment. As indicated at 300, spare LUNs in a storage system may be pre-provisioned to hosts on a storage network so that each spare LUN is accessible to two or more of the hosts through the storage network fabric. The spare LUNs may be divided into one or more pools according to one of the configurations for pools of spare storage as previously described herein.

At some point, a host on the storage network may need additional storage. As indicated at 302, the host may request and obtain exclusive access to one of the spare LUNs to which it has access through the storage network fabric. The spare LUN may then be "removed" from the pool of spare LUNs so that other hosts cannot obtain exclusive access to the LUN. In one embodiment, to obtain exclusive access to a spare LUN, the host may communicate with a coordinating service to request a spare LUN. The coordinating service may determine if there is a spare LUN available that is accessible to the host and that another host has not obtained exclusive access to. In one embodiment, the coordinating service may maintain pool information in which the status of spare LUNs in the pool(s) of spare LUNs is recorded and updated when necessary. If there is a spare LUN available, the coordinating service may then inform the requesting host that it has obtained a selected spare LUN from the pool(s) for exclusive access. The host may then begin using the storage unit represented by the LUN. If there is no spare LUN available to meet the host's request, then the coordinating service may inform the host that no spare LUN is available for exclusive access. Note that errors generated on the host by failure to obtain a spare LUN would be on storage allocation and not on I/O writes.

As indicated at 304, a recordation that the host has obtained exclusive access to the LUN may be made so that other hosts that are configured to access the LUN cannot obtain exclusive access to the LUN. In one embodiment, a coordinating service that coordinates access to the spare LUNs in the pool(s) may record this information in pool information that it maintains. In one embodiment, a form of device reservation such as SCSI-3 persistent reservation may be used to record the LUN assignment. Other embodiments may use other mechanisms, or combinations thereof, to record the LUN assignment.

As indicated at 306, a change control request may be generated to request reconfiguration of the storage network to remove access to the LUN to which the host has obtained exclusive access from the other hosts that have access to the LUN. In one embodiment, an administrator may generate the change control request. In another embodiment, a coordinating service may automatically generate the change control request. As indicated at 308, the storage network may then be reconfigured during a change window in accordance with the change control request. Note that the pool(s) of spare LUNs may be replenished with additional spare LUNs and/or balanced during a change window if necessary.

Figure 9:
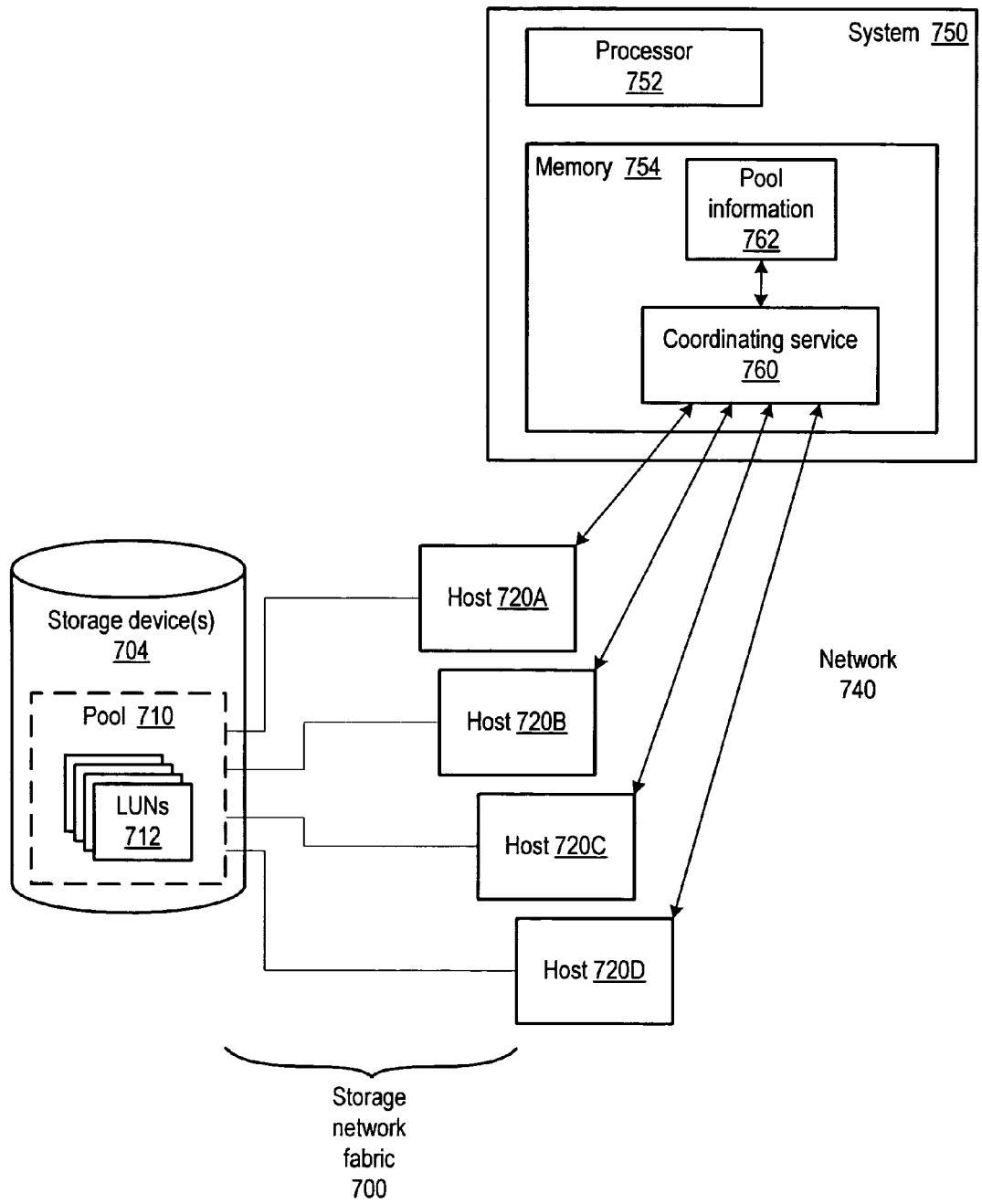
FIG. 9 illustrates an exemplary storage network implementing an embodiment of the pre-provisioning mechanism and including a system including software implementing a coordinating service according to one embodiment.

FIG. 9 illustrates an exemplary storage network implementing an embodiment of the pre-provisioning mechanism and including a system including software implementing a coordinating service according to one embodiment. System 750 may be any of various types of devices, including, but not limited to, a personal computer system, desktop computer, laptop or notebook computer, server, mainframe computer system, workstation, network computer, or other suitable device. System 750 may include at least one processor 752. The processor 752 may be coupled to a memory 754. Memory 754 is representative of various types of possible memory media, also referred to as "computer readable media." Hard disk storage, floppy disk storage, removable disk storage, flash memory and random access memory (RAM) are examples of memory media. The terms "memory" and "memory medium" may include an installation medium, e.g., a CD-ROM or floppy disk, a computer system memory such as DRAM, SRAM, EDO RAM, SDRAM, DDR SDRAM, Rambus RAM, etc., or a non-volatile memory such as a magnetic media, e.g., a hard drive or optical storage. The memory medium may include other types of memory as well, or combinations thereof.

System 750 may couple, for example over a wired or wireless network or networks (e.g. network 740), to one or more other devices, such as hosts 720A through 720D, via one or more wired or wireless network interfaces. System 750 may also couple, over a network, storage network, or by some other type of connection such as direct connection, to one or more storage devices 704, including storage devices on which units of storage (e.g., LUNs 712 in pool 710) are provisioned for one or more hosts 720.

Hosts 720 may couple to the storages devices 704 via a storage network "fabric" 700. This coupling of hosts 720 to storage devices 704 via an infrastructure (storage network fabric 700) may be referred to as a "storage network". A storage network may, for example, be a Storage Area Network (SAN), a LAN with Network-Attached Storage (NAS), or any network capable of coupling storage devices to hosts 720. The storage devices 704 on a storage network may include any of one or more types of storage devices, and may include physical and/or logical devices. A storage device 704 may be any type of computer-accessible medium capable of storing data including, but not limited to: storage media or memory media such as magnetic or optical media, stand-alone disks, RAID systems, JBODs, any of one or more types of backup devices, including, but not limited to, various types of tape devices and optical storage devices, CD-ROM (CD, CD-R, or CD-RW), volatile or non-volatile media such as RAM (e.g. SDRAM, DDR, RDRAM, SRAM, etc.), ROM, Flash Memory, MEMS, etc.

System 750 may include, in memory 754, an implementation of a coordinating service 760. In one embodiment, the coordinating service 760 may maintain information 762 on the spare LUNs in pool 710. If a host 720 needs additional storage, the host 720 may communicate with the coordinating service 760 to request exclusive access to a spare LUN from pool 710 to which the host has access. The coordinating service 760 may select a spare LUN 712 from pool 710 to meet the request, and may inform the requesting host 720 that the host 720 has been granted exclusive access to the LUN. The coordinating service 760 may update its pool information 762 to indicate that the host 720 has been granted exclusive access to the LUN 712 so that no other hosts 720 are granted access to the LUN. A change control request may be generated so that the storage network may be reconfigured, for example during a change window, to remove access to the LUN by all hosts 720 except the host 720 to which exclusive access has been granted. In one embodiment, the coordinating service 760 may automatically generate the change control request. In one embodiment, communications between the hosts 720 and the coordinating service 760 may be via a network 740.

Note that the configuration illustrated in FIG. 9 is an exemplary implementation of a storage network implementing an embodiment of the pre-provisioning mechanism and including a coordinating service and is not intended to be limiting. Embodiments of the pre-provisioning mechanism as described herein may be implemented in other configurations of systems and storage environments.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or CD-ROM, volatile or non-volatile media such as RAM (e.g. SDRAM, DDR, RDRAM, SRAM, etc.), ROM, etc. As well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A method, comprising:
   pre-provisioning a plurality of spare addressable storage units in a storage system to a plurality of host systems on a storage network, wherein the storage network is configurable to allow and configurable to not allow access to particular addressable storage units by particular host systems;
   wherein said pre-provisioning comprises configuring the storage network so that each spare addressable storage unit is currently accessible to two or more of the plurality of host systems through a storage network fabric;
   one of the host systems obtaining exclusive access to one of the spare addressable storage units which the host system is configured to access through the storage network fabric without reconfiguring the storage network to allow or not allow access to particular addressable storage units by particular host systems;
   wherein other host systems are prevented from obtaining exclusive access to the spare addressable storage unit, without reconfiguring the storage network to allow or not allow access to particular addressable storage units by particular host systems, after exclusive access to the spare addressable storage unit has been obtained by the host system.

2. The method as recited in claim 1, further comprising reconfiguring the storage network during a change window to remove access to the spare addressable storage unit to which the host system has obtained exclusive access from the other hosts systems.

3. The method as recited in claim 1, wherein at least one of the host systems comprises a coordinating service for coordinating access to the spare addressable storage units by the host systems, and wherein said obtaining exclusive access to one of the spare addressable storage units comprises:
   the host system communicating with the coordinating service to request a spare addressable storage unit for exclusive access;
   the coordinating service selecting a spare addressable storage unit to which the requesting host system has access and to which no other host system has been granted exclusive access;
   the coordinating service informing the requesting host system that the host system has exclusive access to the selected spare addressable storage unit; and
   the coordinating service recording that the host system has been granted exclusive access to the spare addressable storage unit so that no other host systems are granted exclusive access to the spare addressable storage unit.

4. The method as recited in claim 3, further comprising the coordinating service generating a change control request specifying that the storage network is to be reconfigured during a change window to remove access to the spare addressable storage unit to which the host system has been granted exclusive access from other host systems configured to access the spare addressable storage unit through the storage network fabric.

5. The method as recited in claim 1, wherein the plurality of spare addressable storage units is configured as one or more pools each including two or more spare addressable storage units, and wherein each of the plurality of host systems is configured to access one or more of the spare addressable storage units in at least one of the pools.

6. The method as recited in claim 1, wherein the plurality of spare addressable storage units is configured as one or more pools each including two or more spare addressable storage units, and wherein each of the plurality of host systems is configured to access spare addressable storage units in only one of the pools.

7. The method as recited in claim 1, wherein the plurality of spare addressable storage units is configured as two or more pools each including two or more spare addressable storage units, and wherein each of the plurality of host systems is configured to access one or more of the spare addressable storage units in two or more of the pools.

8. The method as recited in claim 1, wherein each addressable storage unit is represented by a Logical Unit Number (LUN).

9. A storage network system, comprising:
   one or more storage systems comprising a plurality of addressable storage units;
   two or more host systems;
   a storage network fabric for coupling the storage systems to the host systems, wherein the storage network fabric is configurable to allow and configurable to not allow access to particular addressable storage units by particular host systems; and
   one or more pre-provisioned pools each comprising two or more of a plurality of spare addressable storage units, wherein each spare addressable storage unit is configured to be currently accessible to two or more of the host systems through configuration of the storage network fabric;

wherein each host system is configured to obtain exclusive access to spare addressable storage units in the one or more pools which the host system is currently configured to access through the storage network fabric without reconfiguring the storage network fabric to allow or not allow access to particular addressable storage units by particular host systems; and wherein other host systems are prevented from obtaining exclusive access to a spare addressable storage unit in the one or more pools, without reconfiguring the storage network to allow or not allow access to particular addressable storage units by particular host systems, after exclusive access to the spare addressable storage unit has been obtained by one of the host systems.

10. The storage network system as recited in claim 9, wherein the storage network fabric is reconfigurable during a change window to remove access to the spare addressable storage unit to which the host system has obtained exclusive access from the other hosts systems.

11. The storage network system as recited in claim 9,
wherein at least one of the host systems comprises a coordinating service for coordinating access to the spare addressable storage units in the one or more pools by the host systems;

wherein, to obtain exclusive access to a spare addressable storage unit, each host system is configured to communicate with the coordinating service to request a spare addressable storage unit for exclusive access;

wherein, in response to the request, the coordinating service is configured to:
 select a spare addressable storage unit from the one or more pools to which the requesting host system has access and to which no other host system has been granted exclusive access;
 inform the requesting host system that the host system has exclusive access to the selected spare addressable storage unit; and
 record that the host system has been granted exclusive access to the spare addressable storage unit so that no other host systems are granted exclusive access to the spare addressable storage unit.

12. The storage network system as recited in claim 11, wherein the coordinating service is further configured to generate a change control request specifying that the storage network fabric is to be reconfigured during a change window to remove access to the spare addressable storage unit to which the host system has been granted exclusive access from other host systems configured to access the spare addressable storage unit through the storage network fabric.

13. The storage network system as recited in claim 9,
wherein each host system comprises two or more host adapter ports for coupling to the storage network fabric;
wherein each storage system comprises two or more fabric ports for coupling to the storage network fabric;
wherein, for each addressable storage unit, each storage system comprises an access path between the addressable storage unit and one of the fabric ports, wherein each access path corresponds to a Logical Unit Number (LUN), and where each LUN corresponds to one addressable storage unit; and
wherein configuring a LUN to be accessible to a host system comprises masking the LUN to a host adapter port on the host system.

14. The storage network system as recited in claim 9, wherein the plurality of spare addressable storage units is configured as one or more pools each including two or more spare addressable storage units, and wherein each of the two or more host systems is configured to access one or more of the spare addressable storage units in at least one of the pools.

15. The storage network system as recited in claim 9, wherein the plurality of spare addressable storage units is configured as one or more pools each including two or more spare addressable storage units, and wherein each of the two or more host systems is configured to access spare addressable storage units in only one of the pools.

16. The storage network system as recited in claim 9, wherein the plurality of spare addressable storage units is configured as two or more pools each including two or more spare addressable storage units, and wherein each of the two or more host systems is configured to access one or more of the spare addressable storage units in two or more of the pools.

17. A system, comprising:
a processor; and
a memory comprising program instructions, wherein the program instructions are executable by the processor to implement a coordinating service for coordinating access by host systems on a storage network to a plurality of spare addressable storage units in a storage system, wherein the storage network is configurable to allow and configurable to not allow access to particular addressable storage units by particular host systems;

wherein the storage network is configured so that each spare addressable storage unit is currently accessible to two or more of the host systems through a storage network fabric, wherein the coordinating service is configured to, without reconfiguring the storage network to allow or not allow access to particular addressable storage units by particular host systems:
 receive requests for exclusive access to spare addressable storage units from the host systems;
 for each request, determine if there is a spare addressable storage unit to which the requesting host system has access and to which no other host system has been granted exclusive access;
 if there is a spare addressable storage unit available to meet a request:
  inform the requesting host system that the host system has exclusive access to the spare addressable storage unit; and
  record that the host system has been granted exclusive access to the spare addressable storage unit so that no other host systems are granted exclusive access to the spare addressable storage unit.

18. The system as recited in claim 17, wherein the coordinating service is further configured to, if there is a spare addressable storage unit available to meet the request, generate a change control request specifying that the storage network fabric is to be reconfigured during a change window to remove access to the spare addressable storage unit to which the requesting host system has been granted exclusive access from other host systems configured to access the spare addressable storage unit through the storage network fabric.

19. A computer-accessible storage medium comprising program instructions, wherein the program instructions are computer-executable to implement:
 coordinating access by host systems on a storage network to a plurality of spare addressable storage units in a storage system, wherein the storage network is configurable to allow and configurable to not allow access to particular addressable storage units by particular host systems, wherein the storage network is configured so that each spare addressable storage unit is currently accessible to two or more of the host systems through a storage network fabric;

for each request for exclusive access to a spare addressable storage unit from a host system, determining if there is a spare addressable storage unit to which the requesting host system has access and to which no other host system has been granted exclusive access;

if there is a spare addressable storage unit available to meet a request, and without reconfiguring the storage network to allow or not allow access to particular addressable storage units by particular host systems:

informing the requesting host system that the host system has exclusive access to the spare addressable storage unit; and recording that the host system has been granted exclusive access to the spare addressable storage unit so that no other host systems are granted exclusive access to the spare addressable storage unit.

20. The computer-accessible storage medium as recited in claim 19, wherein the program instructions are computer-executable to implement, if there is a spare addressable storage unit available to meet the request, generating a change control request specifying that the storage network fabric is to be reconfigured during a change window to remove access to the spare addressable storage unit to which the requesting host system has been granted exclusive access from other host systems configured to access the spare addressable storage unit through the storage network fabric.

* * * * *